3,347,953
METHOD OF PREPARING A BLEND OF A MELAMINE FORMALDEHYDE RESIN AND A DIAMINOTRIAZINE FORMALDEHYDE RESIN
Franz Kaess, Traunstein, and Horst Michaud and Josef Seeholzer, Trostberg, Germany, assignors to Suddeutsche Kalkstickstoff - Werke Aktiengesellschaft, Bavaria, Germany
No Drawing. Filed Dec. 17, 1963, Ser. No. 331,131
Claims priority, application Germany, Dec. 20, 1962, S 82,985
2 Claims. (Cl. 260—849)

This invention relates to resinous compositions comprising mixtures of aminotriazine-aldehyde resins with other resins, and to structures containing such compositions.

In recent times, structures using resin-impregnated paper sheets, fibrous boards, particle boards, and the like decorated with solidly colored print sheets are being manufactured for many purposes. The efforts to improve the preparation methods and to increase the production of such structures without large investments result in steadily higher specifications for the used resins.

In the press, the resin should cure as fast as possible at not too high temperatures in order to increase the yield. On the other hand, when decorating wallboard or particle board, low pressures should be used which should, if possible, not exceed the pressure applied for the manufacture of the particle board.

This means that the resins must have flow properties ensuring a faultless closed surface. On the other hand, the viscosity of the resin must not be so low that, in the pressing operation, the resin flows into the particle board and that, due to lack of resin, an unsightly and insufficiently resistant surface is produced.

Impregated papers which are shipped for further processing in tropical zones, must harden sufficiently fast on pressing but, on the other hand, must not lose their flow properties during shipment at elevated temperatures.

In the impregnation and pressing of specific designs, particularly of highly pigmented papers, the flow of the resins offers difficulties resulting in a faulty surface.

The invention offers a solution to the aforementioned and other problems in the manufacture of decorated surfaces and laminates by providing a resin composition comprising a melamine-aldehyde resin in mixture with 1 to 30 percent by weight, calculated on said melamine resin, of a resinous reaction product of formaldehyde and a 2,4-diaminotriazine having 0 to 4 carbon atoms in the side chain.

Said resin mixtures is preferably prepared by adding to a conventional melamine resin 1 to 30 parts by weight of a diaminotriazine resin which had been prepared from diaminotriazine and formaldehyde in a mole ratio from 1:15 to 1:5 at a pH of 3.0 to 7.0.

In a modified preparation method, the diaminotriazine resin is precondensed, as described hereinabove or in presence of the total formaldehyde; subsequently the pH is adjusted in the same vessel, if necessary after addition of formaldehyde, to a pH of 7.5 to 10, melamine is introduced, and the condensation is completed.

Instead of, or in addition to, the melamine-formaldehyde resin, such resins modified with a polyol may be used.

If the condensation of the diaminotriazine resin is carried out with a small amount of formaldehyde, it is recommended to add, after termination of the condensation, 0.5 to 3 moles of formaldehyde, calculated on diaminotriazine.

The side chain in the diaminotriazine may be, for example, H=formoguanamine, $CH_3$=acetoguanamine, $C_2H_5$=propioguanamine, $C_3H_7$=n-butyro- or isobutyroguanamine and others.

The thus obtained resins have good flexibility which results in improved pressing properties and reduced crazing when exposed to dry heat. Said resins make it possible to manufacture board suitable for postforming. It has been further found that the sometimes observed bleeding of the phenolic resin (yellowing or flocculation at the surface) is substantially prevented on application of the novel resin blend. Particular mention should be made of the resistance of the resin to variations in the operating conditions during impregnation and molding. In the novel resin compositions have excellent light stability and can be applied in aqueous solution.

Our invention will be described in greater detail in conjunction with the following specific examples which are merely illustrative. It is not intended that the scope of the invention is limited to the details therein set forth. Parts are by weight unless indicated otherwise.

*Resin A.—Preparation of a formoguanamine resin*

145 ml. of formaldehyde, 37% aqueous solution, are charged to a reaction vessel equipped with stirrer, thermometer, and means for reflux and heated up to 70° C. without previous neutralization. Then, 55.5 g. of formoquanamine were added, and the mixture is heated at 90° C. The pH value adjusts itself to 5.5. After 45 min. heating, the mixture is cooled, and the resin is processed as described in Example 1. The pH value is about 6.0.

*Resin B.—Preparation of a acetoquanamine resin*

309 ml. of formalin, 37% (4.2 moles) are charged into a reaction vessel, equipped with stirrer, thermometer, and refluxing means, and, without being neutralized, are heated up to 70° C. Then 125 g. of acetoguanamine (1 mole) are added and heated at 90° C. The pH value adjusts itself to 5.8. After 45 minutes, the mixture is cooled and the resin is processed as described in Example 1. The pH of the resin at 20° C. is 6.2.

*Resin C.—Preparation of a n-butyroguanamine resin*

125 ml. of formalin, 37% are charged to a reaction vessel equipped with stirrer, thermometer, and reflux cooler and, without previous neutralization, heated up to 70° C. Then, 61.2 g. of n-butyroguanamine are added, and the mixture is heated at 90° C. The pH value adjusts itself to 5.8. After 45 minutes, the mixture is cooled, and the resin is processed as described in Example 1. The pH of the resin at 20° C. is 6.3.

*Resin D.—Preparation of a melamine resin having a mole ratio 1:2.7 (melamine:formaldehyde)*

1400 ml. of formalin, 30% are charged to a reaction vessel equipped with stirrer, thermometer, and reflux cooler, and sodium hydroxide is added to give the slurry a pH of 8.3. The reaction mixture is heated, and 700 g. of melamine are added at 70° C. The heating is continued at 90° C., and this temperature is held for 120 minutes, whereby care must be taken to prevent the pH value from falling below 8.2. If necessary, sodium hydroxide is added from time to time in such amounts that the pH value lies between 8.2 and 8.4. When the condensation is terminated, the resin solution, on admixture of 1 part by volume of water to 1 part by volume of the solution at 20° C., becomes just cloudy. The resin solution is adjusted to a pH of 9.5 at 70° C. and then cooled.

*Resin E.—Preparation of a modified resin in a single operation*

555 ml. of formalin, 30% are charged to a reaction vessel equipped with stirrer, thermometer and reflux cooler and, without previous neutralization, heated up to 70° C. Then 28.4 g. of formoguanamine are added; the mixture has a pH of 4.5, which slowly increases. The condensation is carried out for 30 minutes at 70° C., whereupon the pH is adjusted to 8.2. Subsequently, 256 g. of melamine are added, and, while maintaining said pH value, the condensation is continued at 90° C. until 1 part of the resin solution, on admixture of 1 part of water, just develops cloudiness at 20° C. The resin solution is adjusted at 70° C. to a pH of 9.5 and then cooled.

*Resin F*

The procedure is the same as for resin E but the formoguanamine is precondensed at a pH of 6.3 for 60 minutes.

*Resin G.—Preparation of a melamine resin with a mole ratio 1:2 (melamine:formaldehyde)*

573 ml. of formalin, 30% are charged to a reaction vessel equipped with stirrer, thermometer, and reflux cooler, and the pH value is adjusted to 8.3 by means of sodium hydroxide. Then 400 g. of melamine are added, and the mixture is heated up, with stirring, within about 25 minutes to 95° C. After dissolution of the melamine, the pH is adjusted to 9.4. At 95° C. and at a pH value of 9.2 to 9.4 (measured at 20° C.) the condenstation is now continued until the resin solution shows at 20° C. on admixture of 1 part by volume of water to 1 part by volume of the solution just the first signs of clouding. Generally, this takes place 150 minutes after the start of the heating up. After cooling, the pH at 20° C. is adjusted to 9.5.

*Resin H*

518 parts by volume of 30% formalin are charged to a reaction vessel equipped with stirrer, thermometer, and reflux cooler, and the pH value is adjusted to 8.4 by means of sodium hydroxide. 57 parts of sorbitol and 400 parts of melamine are added to the solution, and the mixture is heated up to 95° C. While maintaining a pH of 9.5, the condenstation is continued at said temperature until a drop of the resin solution just produces cloudiness in an excess of water. Then 160 parts of the resin solution B are added, and the condensation at the obtaining pH is continued until the resin solution on mixing of 1 part by volume with 1 part by volume of water just becomes cloudy.

*Resin I*

The pH of 700 parts by volume of a 30% formalin solution is adjusted with sodium hydroxide to 8.3. The solution is heated and 350 parts of melamine are added at 70° C. The mixture is further heated at 90° C. while the pH value during the ensuing condensation is kept between 8.2 and 8.4. When a drop of the resin solution in an excess of water of 20° C. just produces cloudiness, 30 parts of alpha-methylglucoside are added, and condensation is continued until mixing 1 part by volume of the resin with 1 part by voume of water of 20° C. just produces cloudiness.

*Resin K*

700 parts by volume of 30% formalin and 30 parts of glycerol are charged to the reaction vessel, and the pH value is adjusted with sodium hydroxide to 8.3. 350 parts of melamine are added, and the mixture is heated to 90° C. At said temperature and at a pH of 8.2 to 8.4, the condensation is carried out until 1 part by volume of the resin solution with 1 part by volume of water of 20° C. just shows cloudiness.

EXAMPLE 1

Print and overlay papers were impregnated with the following solutions:

(a) An aqueous solution of an unmodified melamine resin of commerce;
(b) An aqueous solution of a commercial melamine resin not modified with a diaminotriazine resin;
(c) The resin solution D;
(d) A mixture of solution (a) with 3% of resin A;
(e) A mixture of solution (a) with 3% of resin B;
(f) A mixture of solution (a) with 10% of resin C;
(g) The resin solution F.

A core assembly of 6 plies of kraft paper impregnated with phenol resin are surfaced with print and overlay sheets, which had been impregnated and dried under the same conditions, and laminates are prepared by pressing the assembly for 15, 20, and 25 minutes at a specific pressure of 80 kg./cm.$^2$ and a temperature of 135° C. and then cooling under pressure to room temperature. The obtained boards are then held air-conditioned for 24 hours at 20° C. and 65% relative humidity and are then tested for acid resistance. This test consists in dropping a 3% hydrochloric acid on the board surface and in determining after what time at a distance of about 25 cm. and under a viewing angle of about 45° with illumination from a 100 watt opal glass lamp destruction of the surface can just be recognized. The following results were obtained:

| Curing Time | 15 min. | 20 min. | 25 min. |
|---|---|---|---|
| Resin Type: | | | |
| (a) | 2–3 min | 5 min | 15 min. |
| (b) | 5 min | 5 min | 30 min. |
| (c) | 3 min | 5 min | |
| (d) | 40 min | 60 min | |
| (e) | 35 min | 35 min | 35 min. |
| (f) | 35 min | 35 min | |
| (g) | 20 min | 20 min | 30 min. |

By means of a gloss meter (system Lange), which determines the light reflected at an angle of incidence of 45°, the following gloss values were determined:

| Curing Time | 15 min. | 20 min. | 25 min. |
|---|---|---|---|
| Resin Type: | | | |
| (a) | 124.3 | 124.3 | 126.6 |
| (b) | 126.0 | 128.3 | 125.6 |
| (c) | 126.0 | 128.0 | |
| (d) | 133.0 | 130.0 | |
| (e) | 129.6 | 135.0 | 131.0 |
| (f) | 131.0 | 130.0 | |
| (g) | 135.3 | 135.0 | 131.0 |

EXAMPLE 2

Print and overlay paper were imperagnated with the following resin solutions:

(a) An aqueous solution of a commercial unmodified melamine-formaldehyde resin;
(h) A mixture of solution (a) with 10% of resin A;
(i) A mixture of solution (a) with 10% of resin B;
(k) A mixture of solution (a) with 10% of resin C.

After impregnating and drying, the papers are packed in a polyethylene bag and stored for 7 and 14 days at 40° C., respectively. Subsequently, a laminate is prepared from the papers as described in Example 1.

The gloss determination gives the following results:

| Storage | 7 days | 14 days |
|---|---|---|
| Resin Type: | | |
| (a) | 118.0 | Porous surface |
| (h) | 126.6 | 124.3 |
| (i) | 125.3 | 123.0 |
| (k) | 121.0 | 121.0 |

EXAMPLE 3

Print and overlay papers are impregnated with the following resin solutions:

(l) The resin solution D;
(m) The resin solution E.

These papers are used, as described in Example 1 for the preparation of laminates by pressing at 135° C. for a period of 20 minutes. After conditioning at 20° C. and 65% relative air humidity, the samples were deformed over a tube of 3 cm. diameter heated at 180° C. in such a way that the decorative layer was lying outwardly.

After the deformation, the gloss at the bend had decreased strongly in sample l, while sample m showed only a slight decrease.

EXAMPLE 4

A printed decorative sheet was impregnated with the following resin solutions, the pH of which had been uniformly adjusted to 8.8 at 20° C., whereby the resin coat was always 120%.

(n) Resin solution G
(o) Resin solution G with 5% of resin solution B.

Particle boards were surfaced with said sheets in such a way that a 160 gr. balance paper sheet impregnated with a phenol-formaldehyde resin is placed between the board and decorative sheet and the assembly is pressed at 140° C. and at a pressure of 18 kg./cm.$^2$ for 13 minutes. The laminate is then cooled under pressure to room temperature.

The surface properties were judged by the pencil test, where the decorative surface is first completely smeared by a medium soft pencil and then wiped clean with a linen rag.

(n) Strong coloring with graphite after wiping due to porous and mat surface areas;
(o) No coloring with graphite; surface is closed and glossy.

EXAMPLE 5

Decorative print papers were impregnated to a resin content of 120% with the following solutions adjusted to a pH of 9.0:

(p) Resin solution G
(q) Resin solution H

Particle boards were surfaced with said sheets by interposing between decorative sheet and board a phenol resin impregnated 160 g. paper sheet and pressing the assembly at 140° C. at a pressuer of 18 kg./cm.$^2$ for 13 minutes. Subsequently, the laminate was cooled under pressure.

The craze resistance to heat was determined by storing 12 x 12 cm. pieces of the boards for 15 hours in an air circulating drying cabinet at 70° C. After removal and cooling, the samples were examined for surface cracks.

(p) Formation of small cracks,
(q) No cracks.

EXAMPLE 6

Unprinted white decorative sheets (filler TiO$_2$) and barrier sheets (also filled with TiO$_2$) were impregnated with the following resin solutions, adjusted to a pH of 9.1, whereby the resin content of the former sheets was 105%, that of the latter sheets 100%.

(r) Resin solution G
(s) Resin solution G+10% resin solution B.

The impregnated papers were dried at 120° C. for 15 minutes, and they were applied to laminates in the conventional manner by placing on a core of several sodium kraft paper sheets impregnated with a phenol-formaldehyde resin first the resin impregnated barrier sheet and then the decorative sheet. The assembly was pressed for 20 minutes at a specific pressure of 100 kg./cm.$^2$ and a temperature of 140° C. Subsequently, the laminates were cooled under pressure.

Appearance of the surface:

(r) Yellow stains, produced by bleeding through of the phenol resin;
(s) Excellent uniformly white finish.

EXAMPLE 7

Decorative sheets are impregnated with resin solution H in such a way that the resin content is 115–120% of the weight of the paper.

Fiber boards are surfaced with said sheets in such a way that a balance paper (grade 140 gr.) impregnated with a phenol-formaldehyde resin is placed between the board and the decorative layer, whereupon the assembly is pressed at 145° C. at a pressure of 45 kg./cm.$^2$ for 13 minutes. In this way, a particularly elastic surface layer was obtained.

EXAMPLE 8

Decorative and overlay sheets were impregnated with the following resin solutions adjusted to a pH of 9.5 at 20° C.:

(t) Resin solution D
(u) Mixture of resin solution I with 5% of resin B.

The resin content of the decorative sheets was 100%, that of the overlay sheets 250%. The impregnated papers were dried for 10 minutes at 120° C. Subsequently, a laminate was assembled in which the overlay and decorative layer were placed on kraft paper sheets impregnated with phenol-formaldehyde resin and suitable for postforming. The laminates were pressed for a period of 20 minutes at a pressure of 80 kg./cm.$^2$ and a temperature of 135° C. Subsequently, the assembly was cooled under pressure. After conditioning at 20° C. and 65% humidity, sample pieces were deformed according to the standards of the National Electrical Manufacturers Association (NEMA) LP 2-2.11 after having been heated in the center by means of an infrared heater at 140° C. After deformation, the bent area showed in sample (t) Several continuous cracks, and in
(u) No cracks.

EXAMPLE 9

Decorative and overlay papers were impregnated with the following resin solutions adjusted uniformly to a pH of 9.5:

(v) Resin solution D
(w) Mixture of resin K with 5% of resin B.

The resin content of the decorative sheets was 100%, that of the overlay papers 250%. The impregnated sheets were dried for 10 minutes at 120° C. A conventional laminate consisting of several phenol resin impregnated sodium kraft paper layers was assembled with said overlay and decorative sheets by pressing for 10 minutes at a pressure of 80 kg./cm.$^2$ and a temperature of 150° C. Subsequently, the laminate was cooled under pressure. Circular holes were punched into sample pieces of the thus produced boards.

The samples (v) showed little cracks originating at the punched holes whereas the samples (w) showed no damage.

The two components of the resin mixtures may be applied also in the form of several members of each group, for instance as several different melamine resins and/or several different resins prepared from formaldehyde and a 2,4-diaminotriazine.

We claim:

1. A method of making a resinous composition suitable for decorating the surface of wallboards and the like comprising condensing a 2,4-diaminotriazine of the general formula

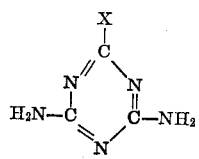

wherein X is a member of the group consisting of hydrogen and alkyl containing 1 to 4 carbon atoms, with formaldehyde in a molar ratio of from about 1:1.5 to about 1:5 at a pH of 3.0 to 6.3 and at a temperature of 70 to 90° C., adding to the thus obtained precondensate a member of the group consisting of (a) a melamine-formaldehyde resin solution condensed at a pH of 7.5 to 10 and a temperature of 70 to 95° C., and (b) the unreacted ingredients of (a), in such an amount that in the end product said diaminotriazine-formaldehyde condensation product constitutes 1 to 30 percent by weight of the total resin content, and continuing the condensation at said temperature of 70 to 95° C. and said pH of 7.5 to 10 until one part of the resin solution on admixture of 1 part of water just develops cloudiness at 20° C.

2. The method as claimed in claim 1 wherein at least part of the melamine-formaldehyde condensation is carried out in the presence of an aliphatic polyol.

References Cited
UNITED STATES PATENTS

| | | | |
|---|---|---|---|
| 2,801,198 | 6/1957 | Morris et al. | 161—263 |
| 2,817,614 | 12/1957 | Fraser | 161—263 |
| 2,916,410 | 12/1959 | Fraser | 161—263 |

MURRAY TILLMAN, *Primary Examiner.*

M. SUSSMAN, J. C. BLEUTGE, *Assistant Examiners.*